United States Patent
Ookubo et al.

(10) Patent No.: US 8,854,513 B2
(45) Date of Patent: Oct. 7, 2014

(54) IMAGING DEVICE TO OUTPUT AN ELECTRIC SIGNAL AND VARY GAIN BASED ON TEMPERATURE OF AN IMAGING ELEMENT

(75) Inventors: Masatoshi Ookubo, Iruma (JP); Tetsuo Sakurai, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 629 days.

(21) Appl. No.: 12/506,081

(22) Filed: Jul. 20, 2009

(65) Prior Publication Data

US 2010/0103295 A1    Apr. 29, 2010

(30) Foreign Application Priority Data

Oct. 23, 2008    (JP) ................................. 2008-273351

(51) Int. Cl.
| | |
|---|---|
| H04N 9/64 | (2006.01) |
| H04N 9/73 | (2006.01) |
| H04N 5/235 | (2006.01) |
| H04N 3/14 | (2006.01) |
| H04N 5/225 | (2006.01) |
| H04N 9/09 | (2006.01) |

(52) U.S. Cl.
CPC ............. *H04N 5/2253* (2013.01); *H04N 9/735* (2013.01); *H04N 9/09* (2013.01)
USPC ...................... 348/255; 348/223.1; 348/227.1; 348/229.1; 348/272

(58) Field of Classification Search
USPC ........ 348/223.1, 222.1, 254, 255, 241, 225.1, 348/372–376, 272, 280, 227.1, 229.1
See application file for complete search history.

(56) References Cited

U.S. PATENT DOCUMENTS

| | | | | | |
|---|---|---|---|---|---|
| 3,548,157 | A | * | 12/1970 | Lauck | ........................... 219/501 |
| 5,322,031 | A | * | 6/1994 | Lerner et al. | .................. 116/208 |
| 5,332,031 | A | * | 7/1994 | Kiga | ................................ 165/86 |
| 6,545,710 | B1 | * | 4/2003 | Kubo et al. | ................ 348/223.1 |
| 7,176,637 | B2 | * | 2/2007 | Inoue et al. | .................... 315/291 |
| 8,019,174 | B2 | * | 9/2011 | Tsuruoka | ...................... 382/275 |
| 2002/0159162 | A1 | * | 10/2002 | Ramm et al. | .................. 359/663 |
| 2004/0075870 | A1 | | 4/2004 | Karaki | |

(Continued)

FOREIGN PATENT DOCUMENTS

| | | |
|---|---|---|
| JP | 61202591 | 9/1986 |
| JP | 1-259692 | 10/1989 |

(Continued)

OTHER PUBLICATIONS

Japanese Patent Application No. 2008-273351, Decision of Rejection, mailed Mar. 2, 2010, (with English Translation).

(Continued)

*Primary Examiner* — Ahmed A Berhan
(74) *Attorney, Agent, or Firm* — Blakely, Sokoloff, Taylor & Zafman LLP

(57) ABSTRACT

According to an embodiment, an imaging device includes a first CCD which converts a first color component into a first electric signal, a second CCD which converts a second color component different from the first color component into a second electric signal, a third CCD which converts a third color component different from the first and second color components into a third electric signal, and a heat sink having first to third radiators which radiate heat from the first to third CODs. The first to third radiators are maintained at the same temperature by the function of the heat sink.

7 Claims, 6 Drawing Sheets

(56) References Cited

U.S. PATENT DOCUMENTS

| | | |
|---|---|---|
| 2005/0201107 A1* | 9/2005 | Seki .............................. 362/373 |
| 2006/0098108 A1* | 5/2006 | Kurosawa ..................... 348/272 |
| 2008/0164316 A1* | 7/2008 | Patel et al. ............... 235/462.43 |
| 2008/0193019 A1* | 8/2008 | Tsuruoka ...................... 382/195 |
| 2009/0086038 A1 | 4/2009 | Karaki |

FOREIGN PATENT DOCUMENTS

| | | |
|---|---|---|
| JP | 5-207486 | 8/1993 |
| JP | 7-154657 | 6/1995 |
| JP | 2001308569 | 11/2001 |
| JP | 2002247594 | 8/2002 |
| JP | 2004120583 | 4/2004 |
| JP | 2007-053499 | 3/2007 |
| JP | 2007134811 | 5/2007 |
| JP | 2007-214674 | 8/2007 |
| JP | 2008-034942 | 2/2008 |
| JP | 2008-072439 | 3/2008 |

OTHER PUBLICATIONS

Japanese Patent Application No. 2008-273351, Notice of Reasons of Rejection, mailed Oct. 20, 2009, (with English Translation).

Japanese Patent Application No. 2009-284206, First Office Action, mailed May 15, 2012, (with English Translation).

* cited by examiner

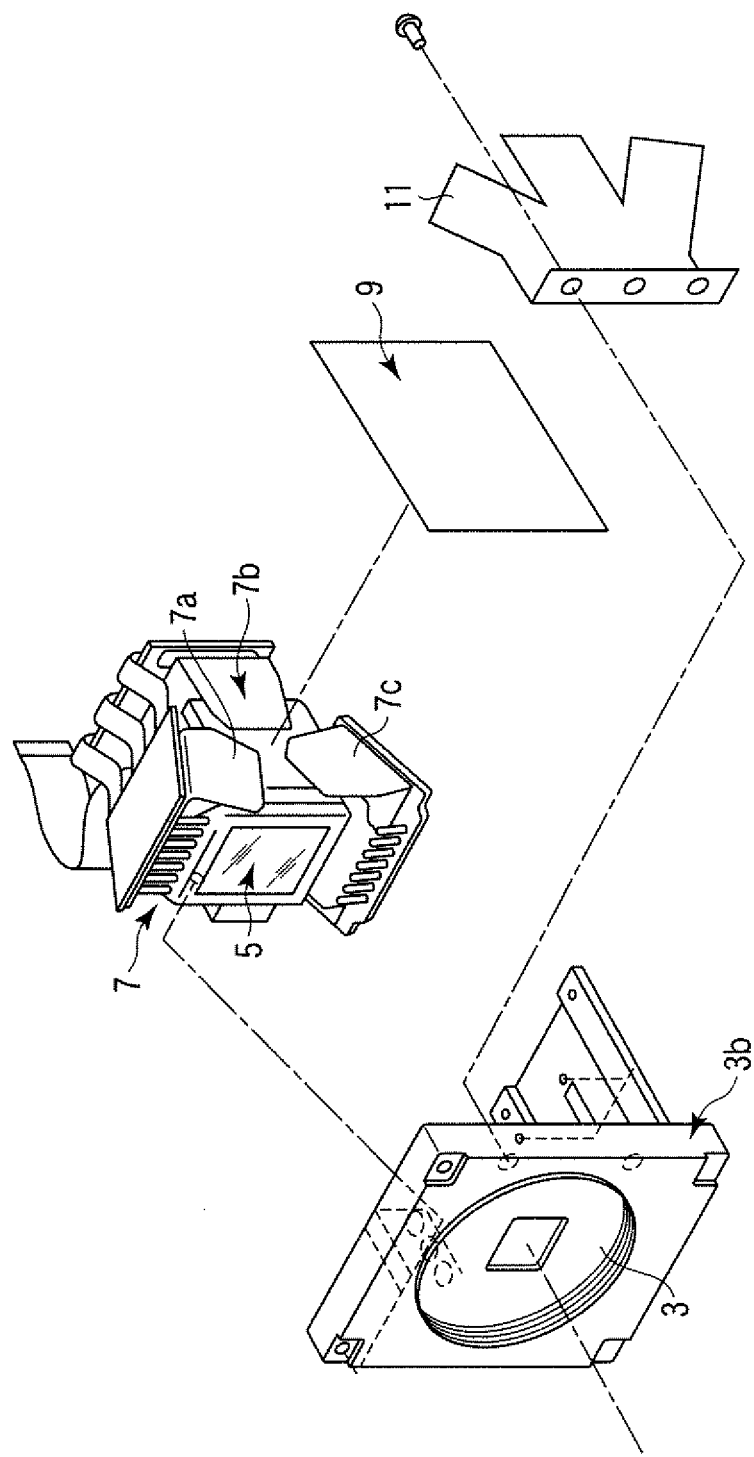
F I G. 1

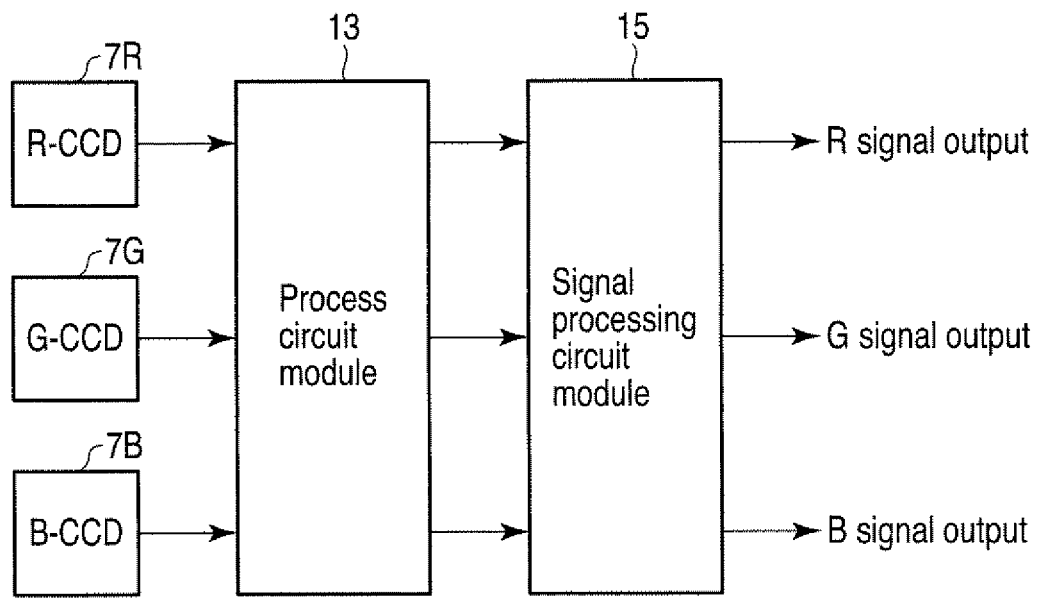
F I G. 2
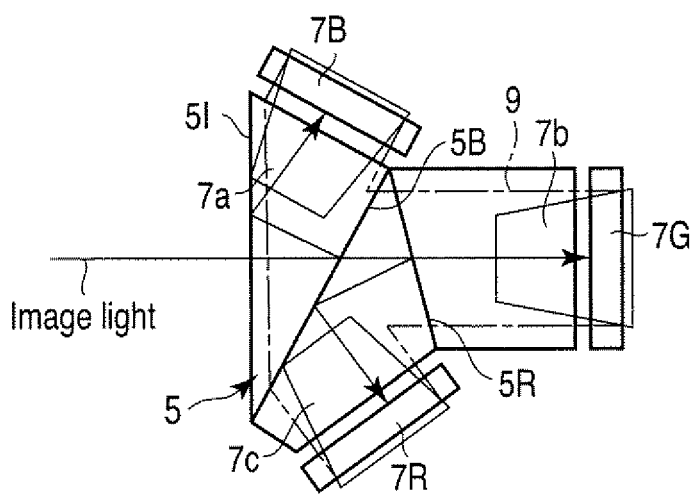
F I G. 3

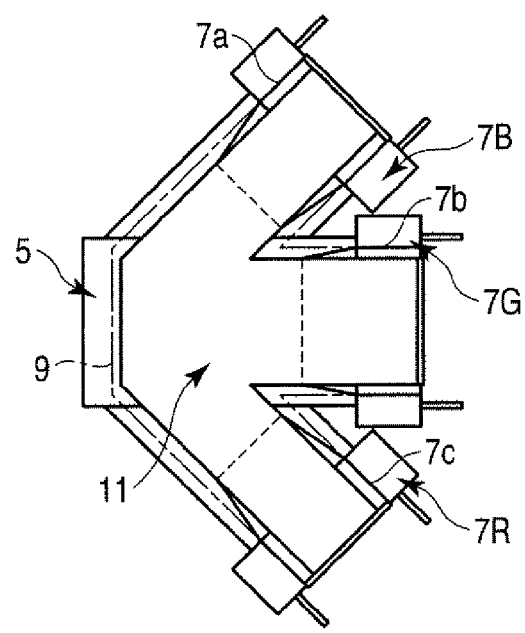
F I G. 4
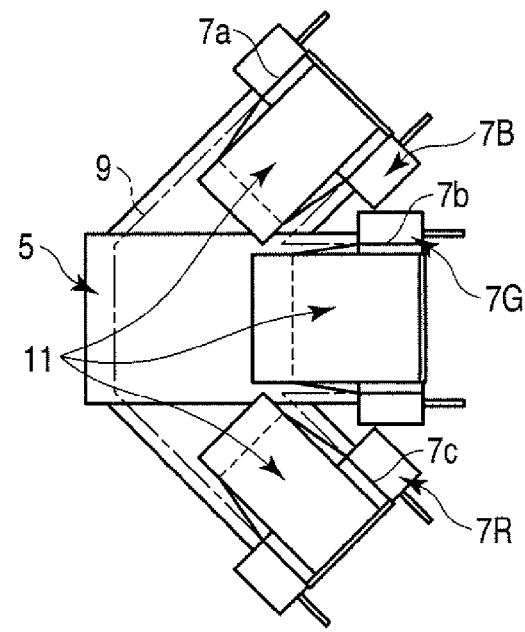
F I G. 5

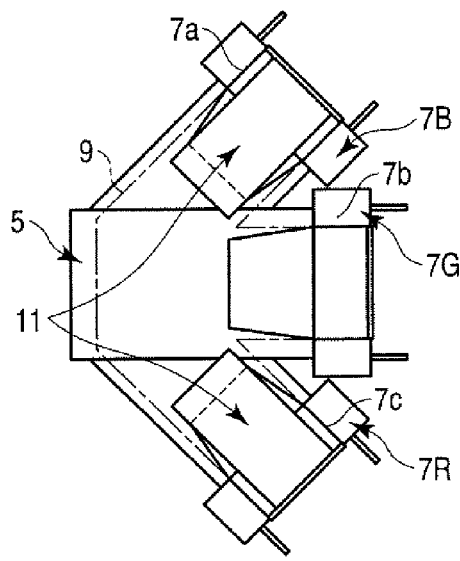
F I G. 6
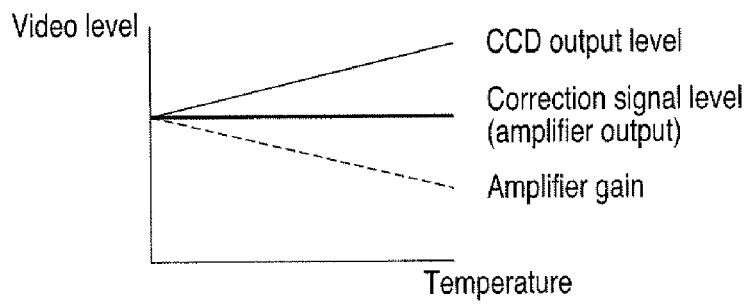
F I G. 7
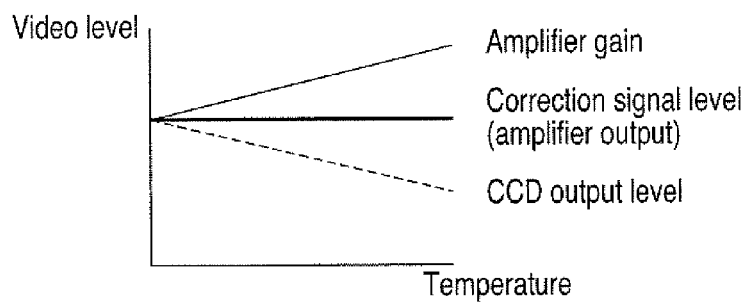
F I G. 8

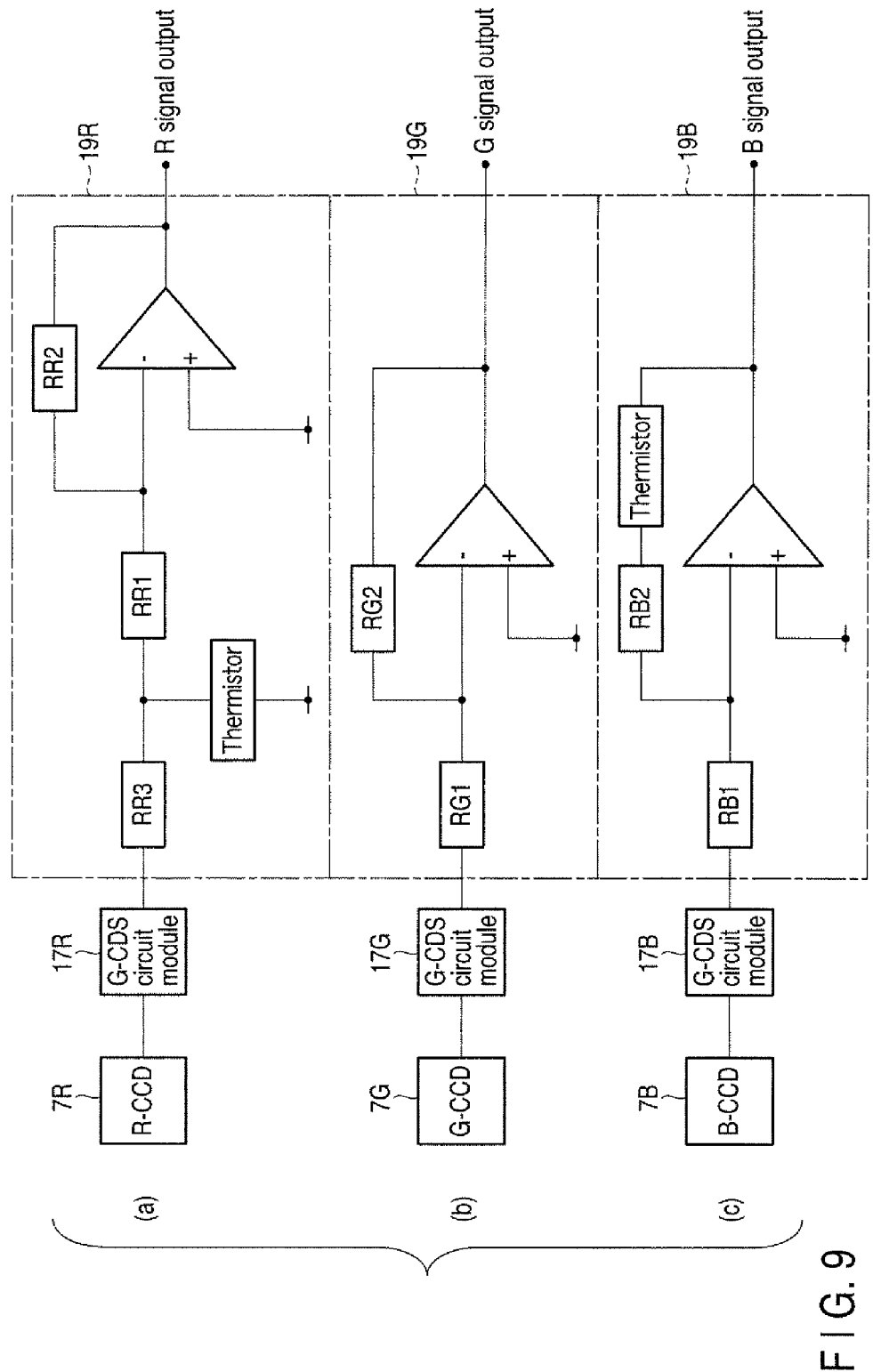
F I G. 9

IMAGING DEVICE TO OUTPUT AN ELECTRIC SIGNAL AND VARY GAIN BASED ON TEMPERATURE OF AN IMAGING ELEMENT

CROSS-REFERENCE TO RELATED APPLICATIONS

This application is based upon and claims the benefit of priority from Japanese Patent Application No. 2008-273351, filed Oct. 23, 2008, the entire contents of which are incorporated herein by reference.

BACKGROUND

1. Field

The present invention relates to an improvement (temperature compensation) in white balance in an imaging device such as an imaging device using a 3-CCD.

2. Description of the Related Art

It is known that an imaging device using a 3-CCD tends to lose white balance because of temperature rises in CCDs for R, G, and B.

Under such circumstances, there has already been proposed a method of inhibiting a change in the white balance in the imaging device using the CCD.

Japanese Patent Application Publication (KOKAI) No. Hei-1-259692 (first document) discloses a single-element solid-state imaging element, wherein the imaging elements are attached to a substrate, and heat of the substrate is radiated so that the imaging elements for R, G, and B may be uniform in temperature to restore the white balance.

Japanese Patent Application Publication (KOKAI) No. Hei-5-207486 (second document) discloses a solid-state imaging element of a 3-CCD using a color separation prism, wherein the imaging elements (R, G, and B) are cooled by an electronic cooler.

Japanese Patent Application Publication (KOKAI) No. 2008-72439 (third document) discloses an image processing apparatus which corrects the loss of the white balance in a CMOS sensor due to a temperature change, in accordance with the difference between a temperature during factory coordination and a current temperature.

The solid-state imaging element shown in the first document is an only one-element type, and there is no statement about the elimination of the loss of white balance due to a temperature rise in each element or due to a change in the sensitivity of each element caused by a temperature rise in the case where imaging elements for R, G, and B are independently provided.

The electronic cooler shown in the second document is known to be highly expensive and to increase an overall size (volume).

The image processing apparatus shown in the third document corrects the white balance in accordance with the difference between a temperature during factory coordination and a current temperature (in an installation environment), when driving the CMOS sensor. However, there is no statement about the elimination of the loss of the white balance due to the difference in temperature rise among the elements in the case where the imaging elements for R, G, and B are independently provided.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary diagram showing an example of a 3-COD imaging device according to an embodiment of the invention;

FIG. 2 is an exemplary diagram showing an example of a signal processing unit used in the 3-CCD imaging device shown in FIG. 1, according to an embodiment of the invention;

FIG. 3 is an exemplary diagram showing an example of a 3-CCD sensor shown in FIG. 1, according to an embodiment of the invention;

FIG. 4 is an exemplary diagram showing an example of the characteristics of the shape of a heat sink in the imaging device shown in FIG. 1, according to an embodiment of the invention;

FIG. 5 is an exemplary diagram showing an example of the characteristics of the shape of the heat sink shown in FIG. 4, according to an embodiment of the invention;

FIG. 6 is an exemplary diagram showing an example of the characteristics of the shape of the heat sink shown in FIG. 4, according to an embodiment of the invention;

FIG. 7 is an exemplary diagram showing an example of the relation between the output of the CCD sensor using the signal processing circuit shown in FIG. 2 and an amplifier gain (correction signal level), according to an embodiment of the invention;

FIG. 8 is an exemplary diagram showing an example of the relation between the output of the CCD sensor using the signal processing circuit shown in FIG. 2 and the amplifier gain (correction signal level), according to an embodiment of the invention;

FIG. 9 is an exemplary diagram for a detailed explanation of the signal processing circuit shown by way of example in FIG. 2, according to an embodiment of the invention.

DETAILED DESCRIPTION

Figure 10:
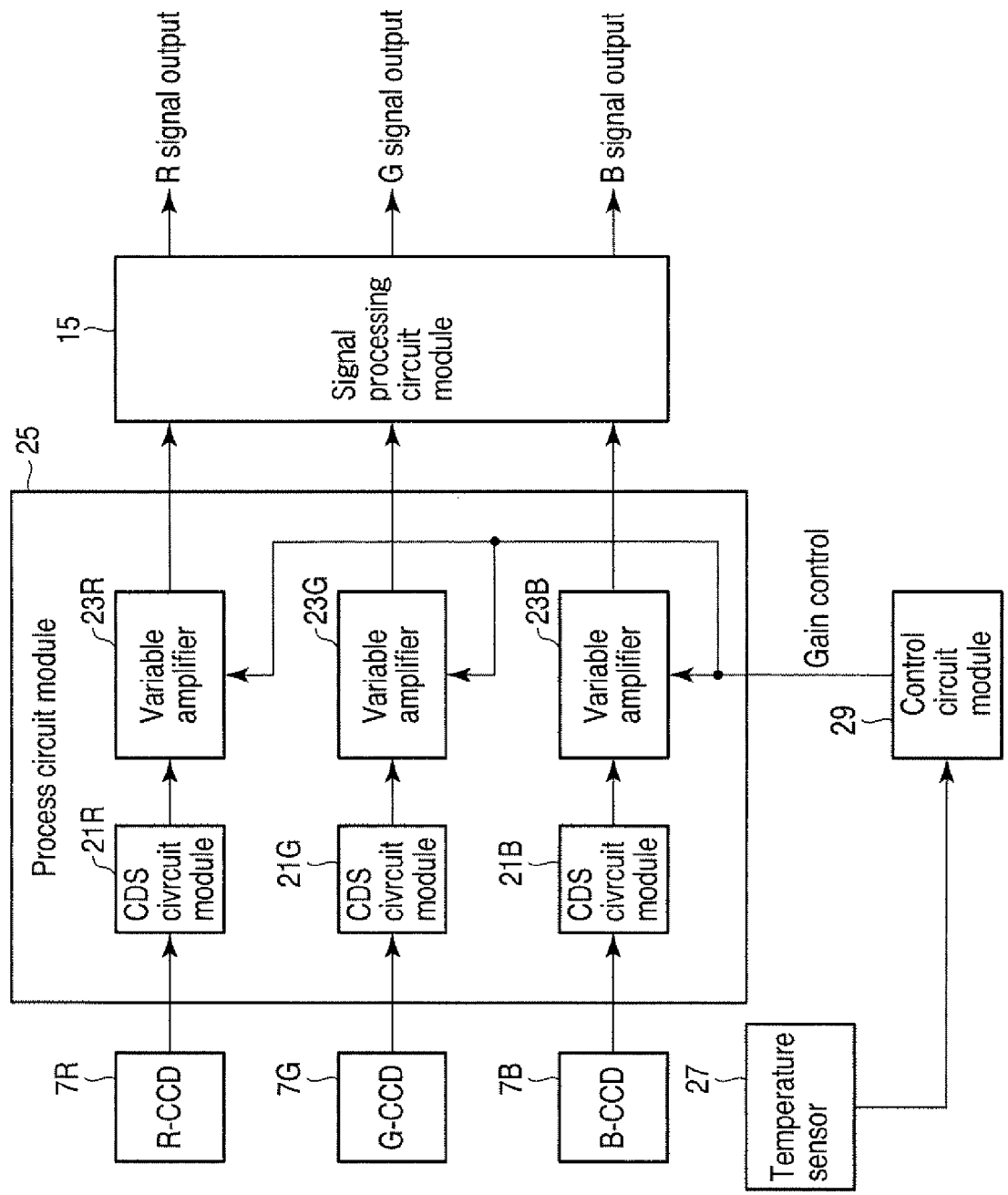
FIG. 10 is an exemplary diagram showing another example of the signal processing circuit shown in FIG. 2, according to another embodiment of the invention.

Various embodiments according to the invention will be described hereinafter with reference to the accompanying drawings. In general, according to one embodiment of the invention, an imaging device comprising: a first element configured to convert a first color component based on additive process into a first electric signal; a second element configured to convert a second color component different from the first color component into a second electric signal in accordance with the additive process; a third element configured to convert a third color component different from the first and second color components into a third electric signal in accordance with the additive process; a first radiator configured to radiate heat from the first element; a second radiator configured to radiate heat from the second element; and a third radiator configured to radiate heat from the third element, wherein the first radiator, the second radiator and the third radiator are maintained at the same temperature.

Embodiments of this invention will be described in detail with reference to the drawings. The various modules of the systems described herein can be implemented as software applications, hardware and/or software modules, or components on one or more computers, such as servers. While the various modules are illustrated separately, they may share some or all of the same underlying logic or code.

FIG. 1 shows an example of a 3-CCD imaging device according to the embodiment of the invention.

An imaging device 1 shown in FIG. 1 includes a lens 3 for receiving image light from a subject, a prism 5 for separating the image light input from the lens 3 into red (R), green (G) and blue (B) which are additive three primary colors, and a 3-COD sensor 7 (R, G, and B) for converting the image lights for R, G and B separated by the prism 5 into input image signals. In addition, the lens 3 is formed detachably from the prism 5 and the 3-COD sensor 7 owing to a cabinet 3a, which is advantageous when the lens 3 needs to be replaced. Moreover, the prism 5 and the 3-GOD sensor 7 are integrally formed, and heat from the 3-COD sensor 7 is radiated by a heat conducting sheet 9 and by a heat sink 11 integrated with the prism 5 and the 3-GOD sensor 7 via the heat conducting sheet 9. Further, one end of the heat sink 11 is connected to the cabinet 3a often made of a metal, which enhances heat radiation efficiency (ensures a great heat radiation amount).

As schematically illustrated in FIG. 2, the input image signals output from the respective components of the 3-COD sensor 7 (R, G, and B) are amplified to a predetermined gain by a process circuit block 13. Then, the input image signals are subjected to analog-to-digital conversion and to predetermined signal processing by a signal processing circuit block 15, and output as an R signal output, a G signal output and a B signal output. In addition, the process circuit block 13 includes a correlated double sampling (CDS) circuit for removing a noise component from the input image signals output from the R, G, and B CCD sensors, a gain control amplifier (GCA) for providing the output of the CDS circuit with a predetermined gain, an analog-to-digital converter for converting (the analog input image signals) into digital signals and outputting the digital signals, etc.

The signal processing circuit block 15 includes a shading correction unit, a gamma (γ) correction unit, etc. The shading correction unit corrects the difference in amount between the image light passed through the center of the lens 3 and the image light passed around the lens 3, out of the signals output from the respective CCD sensors 7. The gamma correction unit corrects the contrast of the input image signals.

The R, G, and B image signals output from the signal processing circuit block 15 are output to, for example, an unshown display unit (monitor unit) or image data storage unit (mass storage unit) which is connected at a subsequent stage via an image output circuit (camera link driver).

FIG. 3 shows an example of the positional relation between a reflection plane of the prism 5 and prisms for the respective colors. The reflection plane of the prism 5 causes the input image light to enter the respective channels of the CCD sensor 7, that is, CCD sensors 7R, 7G, 7B for the respective colors.

Out of the input image light which has entered the prism 5, a blue image component to be received by, for example, a B channel, that is, the COD 7B is reflected by a first wavelength selection film 5B, reflected by a light incidence plane 5I, and guided to a light receiving plane of the COD 7B which is not described in detail. Further, out of the input image light which has entered the prism 5, a red image component to be received by, for example, an R channel, that is, the CCD 7R penetrates through the first wavelength selection film 5B. Thus, the red image component is reflected by a second wavelength selection film 5R, again reflected by the back surface of the first wavelength selection film 5B, and guided to a light receiving plane of the COD 7R which is not described in detail. In addition, out of the input image light which has entered the prism 5, a green image component to be received by, for example, a G channel, that is, the CCD 7G penetrates through the first wavelength selection film 5B and the second wavelength selection film 5R, and is guided to a light receiving plane of the COD 7G which is not described in detail. Moreover, the CCD sensors 7R, 7G, 7B integrally have independent heat sinks 7a, 7b, 7c for radiating the heat of the CCD sensors.

FIG. 4 shows the characteristics of the shape of the heat sink in the imaging device shown in FIG. 1 according to the embodiment.

As shown in FIG. 4, the heat sink 11 is connected to the prism 5 and the 3-CCD sensor 7 laterally via the heat conducting sheet 9 which is provided integrally with the prism 5 and the 3-OCD sensor 7. In addition, in contrast with the independent heat sinks 7a, 7b, 7c that are separately provided for the respective CCD sensors, the heat sink 11 is in an integrated form to equalize the heat from the independent heat sinks 7a, 7b, 7c provided for the CCD sensors 7R, 7G, 7B of the 3-CCD sensor 7 (the heat sink 11 is formed into a single plate having great areas of contact with the CCD sensors 7R, 7G, 7B via the heat conducting sheet 9).

According to this configuration, the blue (B) CCD 7B, green (G) CCD 7G and red (R) CCD 7R have the same temperature rise, so that the difference of sensitivity among the independent CCDs due to the temperature is reduced, and the white balance in the imaging device 1 is stabilized.

FIG. 5 shows another example of the heat sink shown in FIG. 4 in the embodiment.

As shown in FIG. 5, the heat sinks 11 are connected to the prism 5 and the 3-CCD sensor 7 laterally via the heat conducting sheet 9 which is provided integrally with the prism 5 and the 3-CCD sensor 7. In addition, the heat sinks 11 are independently provided for each of the mono-CCD sensors 7R, 7G, 7B of the 3-CCD sensor 7 in accordance with the independent heat sinks 7a, 7b, 7c that are provided for the mono-COD sensors 7R, 7G, 7B. In this case, on the assumption that the heat from the each of the mono-CCD sensors 7R, 7G, 7B is relatively small in amount, the heat sinks 11 do not necessarily have to be connected to the cabinet 3a as shown in FIG. 1.

According to this configuration, the blue (B) CCD 7B, the green (G) CCD 7G and the red (R) CCD 7R have the same temperature rise, so that the difference of sensitivity among the each of the mono-CCDs due to the temperature is reduced, and the white balance in the imaging device 1 is stabilized.

FIG. 6 shows still another example of the heat sink shown in FIG. 4 in the embodiment.

As shown in FIG. 6, the heat sinks 11 are independently provided, through the heat conducting sheet 9 (at two places), only in the heat sinks 7a (sensor 7R) and 7c (sensor 7B) which are provided for the red (R) CCD sensor 7R and the blue (B) CCD sensor 7B of the 3-CCD sensor 7 and contacts the prism 5. In this case, on the assumption that the heat from the CCD sensor 7G is relatively small in amount, the heat sinks 11 do not have to be connected to the cabinet 3a as shown in FIG. 1.

According to this configuration, temperature rises in the blue (B) CCD sensor 75 and the red (R) CCD sensor 7R are suitably controlled on the basis of the green (G) CCD sensor 7G for which the number of reflections by the prism 5 is smaller than other CCD sensors. In other words, while the G component is fixed, the R component and the B component are corrected, so that color irregularities (loss of white balance) can be inhibited.

FIGS. 7 and 8 show the relation between an amplifier gain and the outputs of the red (R) CCD sensor and the blue (B) CCD sensor that use a signal processing circuit shown in FIG. 2.

FIG. 7 shows an example of the red (A) CCD sensor (CCD 7R in FIG. 1). In this example, a video level, that is, a CCD output increases along with rises in the ambient temperature and the temperature of the CCD sensor (an example where a thermistor which increases in resistance along with a temperature rise is used).

In the example shown in FIG. 7, although not shown, the gain is controlled by, for example, a gain control amplifier in the process circuit block 13 so that there may be substantially no increase in the CCD output due to rises in the ambient temperature and the temperature of the CCD sensor.

FIG. 8 shows an example of the blue (B) CCD sensor (CCD 7B in FIG. 1). In this example, the video level, that is, the CCD output decreases along with rises in the ambient temperature and the temperature of the CCD sensor (an example where a thermistor which decreases in resistance along with a temperature rise is used).

In the example shown in FIG. 8, although not shown, the gain is controlled by, for example, the gain control amplifier in the process circuit block 13 so that there may be substantially no decrease in the CCD output due to rises in the ambient temperature and the temperature of the CCD sensor.

It should be understood that FIGS. 7 and 8 are illustrative only. When, for example, the output of the blue (B) CCD sensor increases because of rises in the ambient temperature and the temperature of the CCD sensor, the amplifier gain (correction signal level) decreases as in the example shown in FIG. 7. When, for example, the output of the red (R) CCD sensor decreases because of rises in the ambient temperature and the temperature of the CCD sensor, the amplifier gain (correction signal level) increases as in the example shown in FIG. 8. That is, the thermistor showing reverse temperature characteristics is used in accordance whether the output gain increases or decreases along with a temperature rise, such that a variation of the output level of each CCD with the temperature is counteracted, and the white balance is stabilized.

FIG. 9 shows a circuit example for a detailed explanation of the signal processing circuit shown by way of example in FIG. 2.

As shown in (b) of FIG. 9, a noise component is removed by a G-CDS circuit 17G from the output of the green (G) CCD sensor 7G of the 3-CCD sensor 7 that is schematically shown in FIGS. 1 and 3. Then, the output of the green (G) CCD sensor 7G is amplified to a predetermined level by a gain control unit 19G which includes a serial resistance RG1, a negative feedback amplifier G-GCA and a feedback resistance RG2.

On the contrary, as shown in (a) of FIG. 9, a noise component is removed by an R-CDS circuit 17R from the output of the red (R) COD sensor 7R of the 3-CCD sensor 7 that is schematically shown in FIGS. 1 and 3. Then, the output of the red (R) COD sensor 7R is amplified to a predetermined level by a gain control unit 19R which includes serial resistances RR1 and RR3, a negative feedback amplifier R-GCA, a feedback resistance RR2 and a thermistor RTH. In addition, the thermistor RTH is grounded between the serial resistances RR1 and RR3.

On the other hand, as shown in (c) of FIG. 9, a noise component is removed by a B-CDS circuit 17B from the output of the blue (B) CCD sensor 7B of the 3-CCD sensor 7 that is schematically shown in FIGS. 1 and 3. Then, the output of the blue (B) COD sensor 7B is amplified to a predetermined level by a gain control unit 19B which includes a serial resistance RB1, a negative feedback amplifier B-GCA, a feedback resistance RB2 and a thermistor BTH provided in series to the feedback resistance RB2.

In addition, the gain control units shown in (a) of FIG. 9, (b) of FIG. 9 and (c) of FIG. 9 can be combined together suitably to any color. For example, the gain control unit shown in (a) of FIG. 9 or the gain control unit shown in (c) of FIG. 9 may be used for both the R output and the B output except for the output of the green (G) CCD sensor 7G. Alternatively, the gain control unit shown in (a) of FIG. 9 or the gain control unit shown in (c) of FIG. 9 may be used for all the R, G, and B CCD sensors 7R, 7G, 7B.

When the prism 5 and the 3-CCD sensor 7 shown in FIG. 3 are used, the input image light which is input via the lens 3 is converted to the input image signals for the respective colors R, G, and B. In the embodiment shown in FIG. 3, the number of times that the green image component guided to the G channel, that is, the CCD 7G is reflected by the prism 5 is the smallest. Thus, there is no thermistor for the green (G) COD sensor 7G as shown in (b) of FIG. 9. That is, while the G component is fixed, the R component and the B component are corrected. Consequently, the color irregularities (loss of white balance) can be more stably inhibited.

FIG. 10 shows another example of the signal processing circuit shown by way of example in FIG. 2.

The signal processing circuit shown in FIG. 10 includes a process circuit 25. For the respective color components (R, G, and B) in the input image signals output from the 3-COD sensor 7 (R, G, and B), the process circuit 25 has CDS circuits 21R, 21G and 21B for removing a noise component from the input image signals output from the each of the mono-CCD sensors 7R, 7G and 7B, and variable amplifier circuits 23R, 23G and 23B for providing the outputs of the CDS circuits with predetermined gains. The outputs from the process circuit 25, that is, from the variable amplifier circuits 23R, 23G and 23B for the respective color components are input to the signal processing circuit block 15 described with FIG. 2.

In addition, the gains (adjustment amounts) of the variable amplifier circuits 23R, 23G and 23B of the process circuit 25 are set by a microcomputer unit 29. The microcomputer unit 29 acquires the output of a temperature sensor 27 provided in the vicinity of the prism 5 and the 3-COD sensor 7 to set an instruction value for correcting the outputs of the each of the mono-COD sensors 7R, 7G and 7B for the respective color components, thereby deciding whether to make corrections by the variable amplifier circuits 23R, 23G and 23B and also deciding a correction value. That is, the temperature around the 3-CCD sensor 7 is detected by the temperature sensor 27. Then, in accordance with the temperature detected by the temperature sensor 27, the gain of the process circuit 25 is controlled for each of R, G, and B by the microcomputer unit 29 in which the output level of each of the R, G, and B (mono-) CCDs dependent on temperature is prestored. Consequently, the outputs of the each of the mono-COD sensors 7R, 7G and 7B can be more finely corrected, and the white balance can be maintained in a more satisfactory manner.

As described above, when the output characteristics of the CCD sensors for the respective colors vary because of the change of the ambient temperature or because of a rise in the temperature of the CCD sensor, the white balance is lost and correct color reproduction is impossible. This problem can be ameliorated by the use of one of the embodiments of the present invention.

Furthermore, for example, temperature rises in all the independent CCD sensors can be controlled by heat radiation through a single heat sink to reduce variations in the outputs of the independent CCD sensors with the temperature change.

Still further, variations in the outputs of the independent CCD sensors with temperature rises in the independent CCD sensors are corrected on the basis the temperature detected by the temperature sensor provided in the vicinity of the CCD sensor, so that an imaging device with a more stable white balance can be obtained.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An imaging device comprising:
   a first imaging element configured to receive a first image light component and output a first color electric signal;
   a second imaging element configured to receive a second image light component and output a second color electric signal;
   a third imaging element configured to receive a third image light component and output a third color electric signal;
   a first gain controller including a first thermistor to vary a first output from the first gain controller, the first gain controller configured to vary a first gain of the first color electric signal in accordance with variations of a temperature of the first imaging element and an ambient temperature; and
   a second gain controller including a second thermistor to vary a second output from the second gain controller, the second gain controller configured to vary a second gain of the second color electric signal in accordance with variations of a temperature of the second imaging element and the ambient temperature,
   wherein a number of times the third image light component is reflected by a prism to the third imaging element is less than a number of times the first image light component and second image light component are reflected by the prism to the first imaging element and the second imaging element respectively, and
   wherein the first imaging element is a sensor to receive the first image light component, the second imaging element is a sensor to receive the second image light component and the third imaging element is a sensor to receive the third image light component being a green image component.

2. The imaging device of claim 1, being a charge coupled device (CCD) sensor.

3. The imaging device of claim 1, wherein
   the first thermistor includes a first element configured to decrease in resistance in accordance with ambient temperature and the temperature of the first imaging element, and
   the second thermistor includes a second element configured to decrease in resistance in accordance with the variations of the ambient temperature and the temperature of the second imaging element.

4. The imaging device of claim 1, wherein
   the first thermistor includes a first element configured to increase in resistance in accordance with ambient temperature and the temperature of the first imaging element, and
   the second thermistor includes a second element configured to increase in resistance in accordance with the variations of the ambient temperature and the temperature of the second imaging element.

5. An imaging method comprising:
   receiving a first image light component and outputting a first color electric signal;
   receiving a second image light component and outputting a second color electric signal;
   receiving a third image light component and outputting a third color electric signal; and
   controlling a gain of the first color electric signal and a gain of the second color electric signal in accordance with a change in an ambient temperature, and wherein a number of times the third image light component is reflected by a prism to a third imaging element is less than a number of times the first image light component and second image light component are reflected by the prism to a first imaging element and a second imaging element respectively, and
   wherein the first imaging element is a sensor to receive the first image light component, the second imaging element is a sensor to receive the second image light component and the third imaging element is a sensor to receive the third image light component being a green image component.

6. The imaging method of claim 5, wherein controlling the first gain and the second gain is performed by the first color gain controller and the second color gain controller, if resistance increases along with a temperature rise.

7. The imaging method of claim 5, wherein the controlling the first gain and the second gain is performed by the first color gain controller and the second color gain controller, if resistance decreases along with a temperature rise.

* * * * *